(12) United States Patent
Murthy et al.

(10) Patent No.: US 9,783,063 B2
(45) Date of Patent: Oct. 10, 2017

(54) REGENERATIVE BRAKING CONTROLLER FOR ELECTRIC MOTORS

(71) Applicant: Texas Instruments Incorporated, Dallas, TX (US)

(72) Inventors: Aravind Samba Murthy, Atlanta, GA (US); David Patrick Magee, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 82 days.

(21) Appl. No.: 14/837,810

(22) Filed: Aug. 27, 2015

(65) Prior Publication Data
US 2017/0057360 A1    Mar. 2, 2017

(51) Int. Cl.
*B60L 7/14* (2006.01)
*B60L 7/26* (2006.01)
*B60L 11/18* (2006.01)

(52) U.S. Cl.
CPC ............ *B60L 7/14* (2013.01); *B60L 7/26* (2013.01); *B60L 11/1803* (2013.01); *B60L 2220/12* (2013.01)

(58) Field of Classification Search
CPC .......................................................... B60L 7/14
USPC .................................................. 318/376, 362
See application file for complete search history.

(56) References Cited

U.S. PATENT DOCUMENTS

| 7,034,482 | B2 | 4/2006 | Komiyama et al. |
| 7,602,137 | B2 * | 10/2009 | Du ........................ H02K 1/278 318/771 |
| 7,893,637 | B2 | 2/2011 | Suhama et al. |
| 8,567,547 | B2 | 10/2013 | Kulatunga |
| 2004/0062062 | A1 | 4/2004 | Lee et al. |

FOREIGN PATENT DOCUMENTS

| DE | 102005021251 A1 | 12/2005 |
| EP | 2688077 A1 | 1/2014 |

OTHER PUBLICATIONS

International Search Report for PCT/US2016/049295 mailed Dec. 8, 2016.

\* cited by examiner

*Primary Examiner* — David S Luo
(74) *Attorney, Agent, or Firm* — John R. Pessetto; Charles A. Brill; Frank D. Cimino

(57) ABSTRACT

A method of regenerative braking includes providing an electric motor including at least one stator and a rotor, a speed of the rotor, a motor controller that regulates a current level in the stator winding, a power inverter which controls an energy flow to the stator terminal, and an energy storage system (ESS) which exchanges energy with the motor. A battery management circuit is between the power inverter and the ESS, and a processor has an associated memory storing a regenerative braking (RB) algorithm. The RB algorithm during braking causes the motor controller to execute determining an RB torque value from the rotor speed that maximizes regenerative braking current, and the power inverter is used to redirect the RB current to maximize a power transfer from the motor to the ESS.

7 Claims, 8 Drawing Sheets

REGENERATIVE BRAKING CONTROLLER FOR ELECTRIC MOTORS

FIELD

Disclosed embodiments relate to regenerative braking control for electric motors.

BACKGROUND

An electric motor is a machine that converts electrical energy into mechanical energy. Electric motors include DC motors and AC motors. One type of AC motor is an AC induction motor. An AC induction motor is typically driven by 3-phase alternating current provided by an electric motor controller coupled to a 3-phase inverter. The AC motor includes an outside stationary stator having coils supplied with alternating current to produce a rotating magnetic field, which induces a current in the rotor windings. As the current flows through the rotor windings, a second magnetic field is generated which interacts with the magnetic field from the stator to produce motion. The rotor is attached to the output shaft that is given a torque by the rotating magnetic field. The interaction of the rotor field and the stator field causes rotation of the rotor which can be used to perform work.

Another type of AC motor is a permanent magnet motor (PMM). PMMs have permanent magnets located on the rotor and copper windings located on the stator. The alternating current in the stator windings produces a rotating magnetic field which interacts with the magnetic field from the rotor magnets to produce motion. The frequency at which the stator current oscillates determines the rotor's angular velocity and the resulting angular position.

Electric motors have two mechanical operations, motoring and braking. In a torque vs. speed plot, quadrants I and III of the torque-speed plane represent forward and reverse motoring operations and quadrants II and IV represent forward and reverse braking operations. The braking operation is regenerative when the electric motor is operated as an electric generator such that the kinetic energy of the rotor is converted to electricity and fed back to the power source. Not all operating points in the braking quadrants are regenerative in nature, therefore, regenerative braking is a subset of the braking quadrants. The boundaries of the regenerative braking operation in the braking quadrants need to be determined so that a closed-loop control system does not place an operating point in the non-regenerative braking zone which causes the machine to draw power from the source in order to achieve braking.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize braking an electric motor can remove kinetic energy from the motor system if done properly, but in conventional electrical braking systems, this kinetic energy is typically not recovered by the system. During a typical electrical braking process, additional electrical energy from the battery is needed to slow down the motor and none of the available kinetic energy is recovered. Disclosed embodiments include an optimal regenerative braking (RB) algorithm which provides a braking torque for electric motors which recovers a significant amount of the kinetic energy when braking from one speed to a lower speed.

Disclosed RB algorithms are independent of reference frame transformations and the method of motor control. The electric motor itself is controlled through disclosed software code which functions as the brake so that there is no need for an external mechanical brake (such as hydraulic brakes in an automobile). Disclosed RB algorithms also apply to motor systems having an external mechanical brake. In the presence of an external mechanical brake, disclosed RB algorithms can be used to make sure that the electric motor follows a prescribed torque trajectory such that maximum current is returned to the energy storage system (ESS, such as a battery) during the braking event. Since disclosed RB algorithms are independent of reference frame transformations and the control method, the control scheme utilized with disclosed algorithms can in one particular embodiment be field oriented control (FOC). Disclosed RB algorithms can also be operated in a stationary reference frame which removes the need for FOC.

For example, control schemes that can be used include the motor controller operating in the $\alpha/\beta$ frame, where the voltage/current in each coordinate is independently controlled and then transformed via a Space-Vector Generator (SVG). This converts the desired voltage vector ($V\alpha\beta$) into pulse width modulation (PWM) time durations to generate motor phase voltages ($V\alpha\beta$) or currents Iabc to provide the desired voltage or current level. The motor controller can also operate in the A/B/C frame to allow control of the voltage/current of each of the motor phases directly.

BRIEF DESCRIPTION OF THE DRAWINGS

Reference will now be made to the accompanying drawings, which are not necessarily drawn to scale, wherein.

DETAILED DESCRIPTION

Figure 1A:
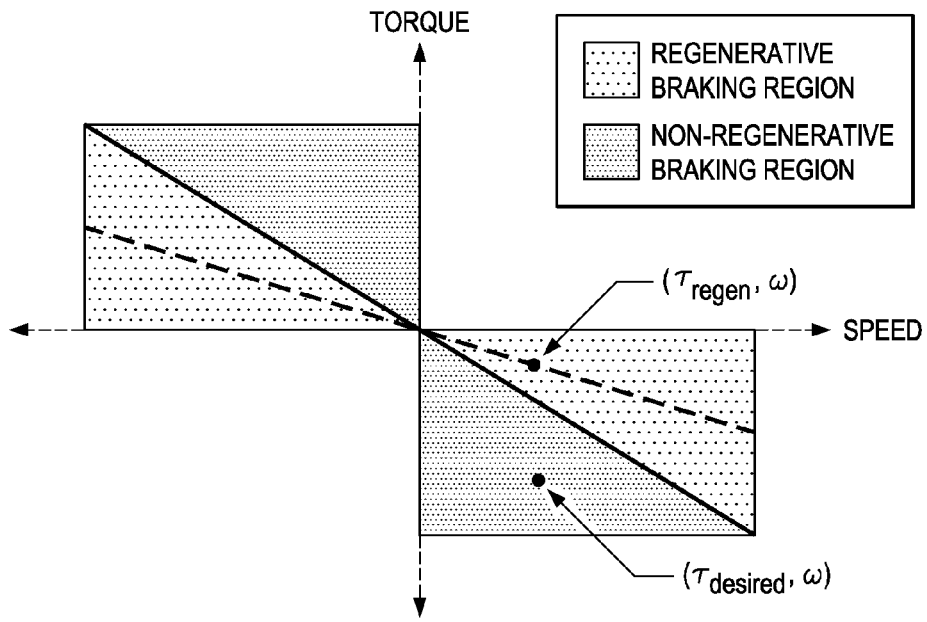
FIG. 1A depicts a torque vs. speed plot showing representative desired and regenerative braking torques at a nominal rotor speed, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed methods of RB comprise providing an electric motor (motor) comprising a rotor, a measured or estimated speed of the rotor (rotor speed) and braking torque values as a function of rotor speed, where each torque value is designed to maximize the RB current returned to the ESS that is typically a battery. The general trend is that as the rotor speed decreases, the level of braking torque decreases. A procedure for determining a braking torque that maximizes the RB current is described below using symbolic closed-form expressions or solved using numerical optimization methods.

Disclosed braking strategy is described for two different motor system scenarios, one where an external brake is present and one where an external brake is absent. In the presence of an external brake, it may be advisable to decompose the desired braking torque level into two components. The electric motor applies one torque component that provides the maximum RB current to recover energy using the disclosed RB algorithm, and another torque component that is provided by the external brake to meet the desired braking torque command from the speed controller (see speed controller 251' in FIG. 2B described below).

Therefore, a braking strategy is formulated that uses this decomposition of desired torque concept, as shown in FIG. 1A which shows a torque vs. speed plot showing a desired braking torque level (calculated by the speed controller), $\tau_{desired}$, at a desired speed, $\omega$, that is in the non-regenerative braking region. A non-regenerative braking region is a subset of the braking quadrants in the torque vs speed plane where energy from the ESS is used to provide a portion of $\tau_{desired}$. $\tau_{desired}$ can be decomposed into the optimal RB torque, $\tau_{regen}$, that provides the maximum RB current (being in the RB region) and the remaining braking torque that is applied by the external brake, $\tau_{ext} = \tau_{desired} - \tau_{regen}$.

For motor systems having an external brake, since the desired torque level is being applied by the combination of motor braking and external mechanical braking during the braking event, this strategy does not affect the time that it takes to slow down. In the absence of an external brake, disclosed RB braking strategy is designed such that if $\tau_{desired}$ is greater than the optimal RB torque at that rotor speed, $\tau_{regen}$, then the braking torque that is applied by the motor is limited to $\tau_{regen}$ which is a function of rotor speed as described above. This method applies a braking torque that is less than the desired torque level (commanded by the speed controller) thereby increasing the time that it takes to slow the motor down. However, a significant amount of energy is still recovered by the ESS during the braking process.

Figure 1B:
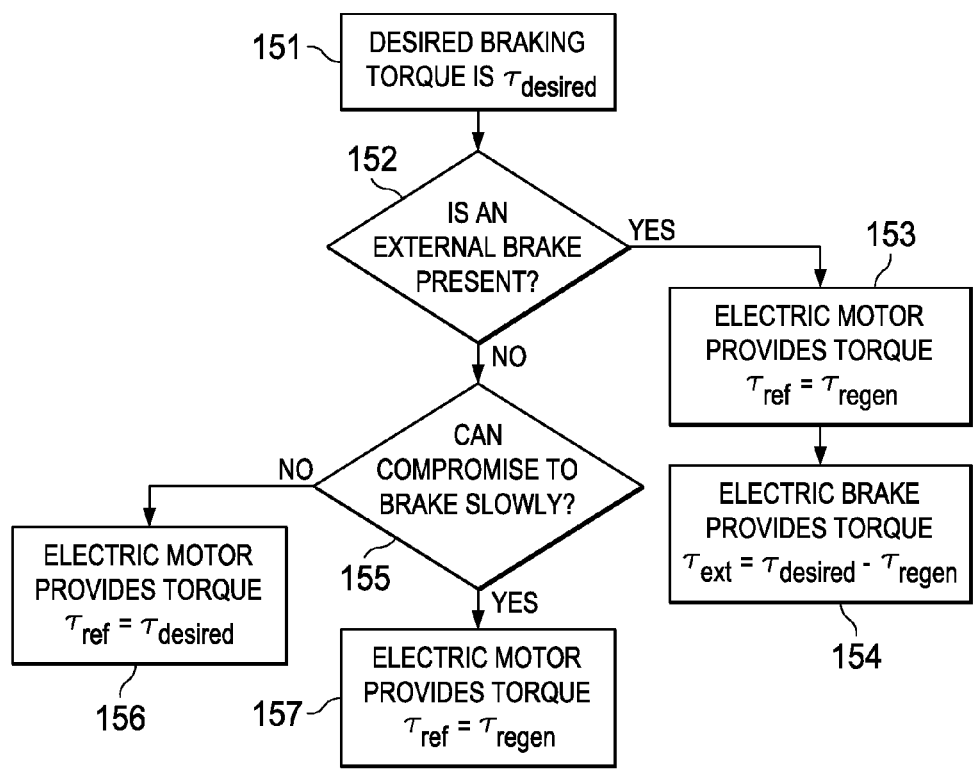
FIG. 1B depicts a flow chart of the logic for an example RB strategy, according to an example embodiment.

There are a wide variety of motor applications in which braking in the shortest amount of time or the shorted distance is not required or even needed. In these applications, the trajectory can be planned such that the motor operates along the braking torque curve that produces the maximum RB current. A flow chart showing the logic for the overall RB strategy is shown in FIG. 1B. Step 151 comprises providing a desired braking torque level ($\tau_{desired}$) that is calculated by the speed controller. Step 152 considers whether the motor system includes an external brake. If the motor system includes an external brake, the method moves to step 153 comprising having the motor controlled to provide a torque $\tau_{ref} = \tau_{regen}$, and then step 154 comprises having the external break controlled to provide an external brake torque $\tau_{ext} = \tau_{desired} - \tau_{regen}$. If the motor system does not include an external break, the method moves to step 155 comprising considering can there be a compromise to brake slowly. If there cannot there be a compromise to brake slowly, the method moves to step 156 comprising having the motor controlled to provide a torque $\tau_{ref} = \tau_{desired}$. If there can be a compromise to brake slowly, the method moves to step 157 comprising having the motor controlled to provide a torque $\tau_{ref} = \tau_{regen}$.

In order implement the disclosed braking strategy, knowledge of the braking torque that corresponds to maximum RB current for essentially every permissible speed is needed for the particular motor design. As described above, this information can be obtained from a closed-form expression for SPMs. A closed-form expression can also be obtained for other motor types, such as switched reluctance motors, DC stepper motors, or induction motors.

Obtaining a closed-form expression for the torque that maximizes the RB current is a typically a straightforward task for motors such as surface mounted permanent magnet motors (SPMs) with the core-loss resistance neglected. The RB controller 240 described below relative to FIG. 2B is shown using the $\tau_{desired}$ output from the speed controller shown as 251' and the angular velocity estimate $\hat{\omega}(n)$ from the EST block 215 (see FIG. 2B where it is shown as "Estimator" 215 described below) to determine the level of external braking and the level of maximum RB current at that particular rotor mechanical speed, which is found from Equation 1 (below):

$$\tau_{regen} = -\left(\frac{K_b^2}{2R_s}\right)\omega \quad (1)$$

where $K_b$ is the back-EMF constant of the motor, $R_s$ is the resistance of the stator windings, and $\omega$ is the rotor's mechanical speed.

As the rotor speed $\omega$ decreases, less braking torque is commanded during operation along the curve of maximum regenerative braking current. Therefore, the rotor speed approaches zero asymptotically and reaches zero speed in infinite time. Accordingly, there is a minimum speed, $\omega_{regen,min}$ below which the RB controller will disable operating along the optimal braking torque curve. The operating point is only modified for points in the braking quadrants (4$^{th}$ and 2$^{nd}$) that lie below (or above for the 2$^{nd}$ quadrant) the braking torque curve that provides the maximum RB current.

Figure 2A:
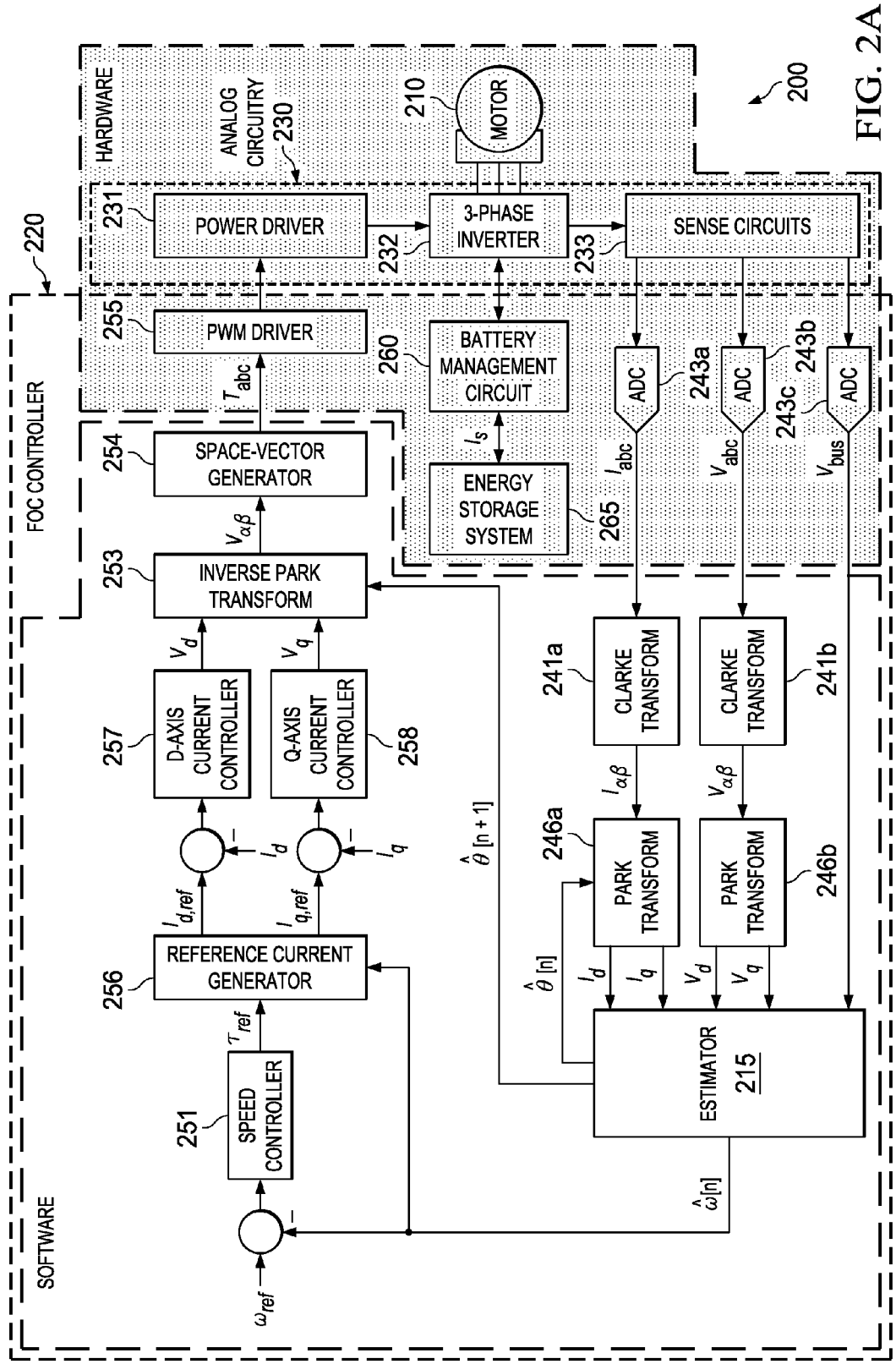
FIG. 2A is a block diagram depiction of a controlled motor system without an external brake within a common FOC controller, according to an example embodiment.
Figure 2B:
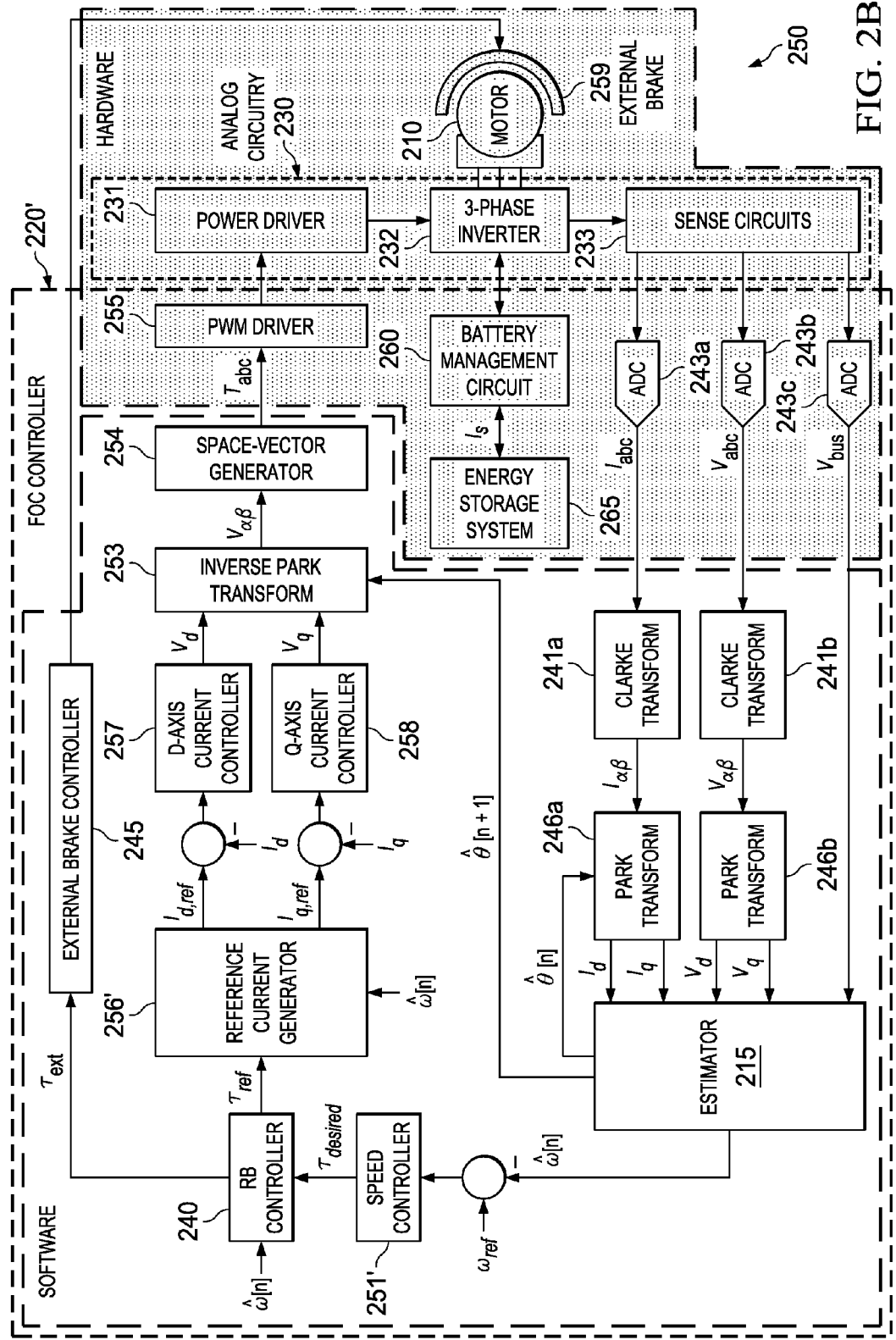
FIG. 2B is a block diagram depiction of a controlled motor system including an external brake and an RB controller within a common FOC controller, according to an example embodiment.

FIG. 2A is a block diagram depiction of a controlled motor system 200 without an external brake within a common FOC controller 220, according to an example embodiment. The motor 210 can be a permanent magnet (PM) motor or an AC (alternating current) induction motor. The FOC controller 220 includes a non-volatile (NV) memory, such as a read only memory (ROM) or static random access memory (SRAM), and a processor such as a central processing unit (CPU) that implements in software all the blocks in the encircled region shown as software as shown in FIG. 2A. Hardware components of system 200 such as implemented by a CPU and NV memory are shown in an encircled region labeled hardware to distinguish them from components of system 200 implemented in software.

System 200 includes analog circuitry 230 between the FOC controller 220 and the motor 210 comprising power driver 231, 3-phase inverter 232, and sense/measurement circuits (shown as sense circuits) 233. The FOC controller 220 includes analog-to-digital converters (ADC's) 243a-c coupled to receive outputs from the sense circuits 233.

The current measurements for the respective phases Iabc output by ADC 243a is shown coupled to an input of the Clarke transform block (Clark block) 241a, and the voltage measurements for the respective phases Vabc output by ADC 243b is shown coupled to an input of the Clarke block 241b, where the Clark blocks perform the known Clarke transformation which takes the measured current or voltage in the abc frame and transforms it into the α/β coordinate system to generate Iαβ which is coupled to an input of the Park transform block (Park block) 246a, and Vαβ which is coupled to an input of the Park transform block 246b. Park blocks 246a, 246b also receive $\hat{\theta}[n]$. Park block 246a, performs the known Park transformation to provide outputs Id and Iq being measured phase current values from the stator terminals of the motor 210, and Park block 246a performs the known Park transformation to provide outputs Vd and Vq being measured phase voltage values from the stator terminals of the motor 210. Id, Iq Vd and Vq are all input to the EST block 215 labeled as "Estimator" 215.

The EST block 215 is shown outputting an angular velocity estimate $\hat{\omega}(n)$. The estimated angular velocity $\hat{\omega}(n)$ is subtracted from the reference velocity, $\omega_{ref}$, with the result of the difference provided to the speed controller 251 as shown. The $\hat{\theta}[n+1]$ angular estimate from the EST block 215 is also coupled to an input of the inverse Park (iPARK) block 253, which outputs Vαβ that is coupled to space-vector generator (SV generator) block 254, where the output of SV generator block 254 is coupled to a PWM driver 255. The SV generator 254 computes the PWM time durations for each phase of the motor 210 to produce the desired Vαβ voltage values. The output of the PWM driver 255 is coupled to an input of a power driver 231 that has an output coupled to drive an input of the 3-phase inverter 232. In this voltage mode control embodiment, the 3-phase inverter 232 forces voltage onto the stator terminals associated with each of the three phases of the motor 210.

The reference current generator 256 receives $\tau_{ref}$ from the speed controller 251 and $\hat{\omega}(n)$ from the EST 215 as inputs, and outputs $I_{d,ref}$ and $I_{q,ref}$ reference currents. $I_d$ from the Park block 246a is subtracted from $I_{d,ref}$ with the result coupled to an input of a D-axis current controller 257 which provides a $V_d$ output. $I_q$ from Park block 246a is subtracted from $I_{q,ref}$ with the result coupled to an input of a Q-axis current controller 258 which provides a $V_q$ output. The $V_d$ output and $V_q$ output are both coupled to an iPARK block 253 which receives the $V_q$ output from Q-axis current controller 258, the $V_d$ output from the D-axis current controller 257, and as described above the $\hat{\theta}[n+1]$ angular estimate output by the EST block 215.

System 200 also includes a battery management circuit 260 and an ESS 265 such as a battery. The battery management circuit 260 is coupled to an output of the inverter 232. The battery management circuit controls 260 a maximum level of RB current flowing into the ESS 265 using a current regulation circuit, wherein the maximum RB current level can be based on the maximum charging current the ESS 265 can support.

A disclosed RB controller can be seamlessly integrated into the common FOC system 200 shown in FIG. 2A to provide the controlled motor system (system) 250 shown in FIG. 2B having a RB controller 240 with a motor controller 220' (FOC controller) for controlling a motor 210 including an external brake 259 shown as a three-phase motor, according to an example embodiment. In this embodiment the speed controller shown as 251' receives the difference of the reference velocity $\omega_{ref}$ and the estimated angular velocity $\hat{\omega}(n)$ from EST block 215, with this difference provided to the speed controller 251 as shown. Speed controller 251' outputs a desired torque $\tau_{desired}$ to an input of the RB controller 240. The RB controller 240 also receives the angular velocity estimate $\hat{\omega}(n)$ from the EST block 215, and provides two outputs shown as $\tau_{ext}$ and $\tau_{ref}$. The $\tau_{ref}$ output from the RB controller 240 is shown coupled to an input of the reference current generator shown as 256' which also receives $\hat{\omega}(n)$ from EST 215 as another input, and $\tau_{ext}$ is coupled to the input of an external brake controller 245 which is coupled to drive the external brake 259.

As with system 200, the reference current generator 256' outputs $I_{d,ref}$ and $I_{q,ref}$ reference currents. $I_d$ from the Park block 246a is subtracted from $I_{d,ref}$ with the result coupled to an input of a D-axis current controller 257 which provides a $V_d$ output. $I_q$ from Park block 246a is subtracted from $I_{q,ref}$ with the result coupled to an input of a Q-axis current controller 258 which provides a $V_q$ output. The $V_d$ output and $V_q$ output are both coupled to an iPARK block 253 which receives the $V_q$ output from Q-axis current controller 258 and the $V_d$ output from the D-axis current controller 257. The Vαβ output of iPARK block 253 is coupled to a SV generator block 254, where the output of SV generator block 254 is coupled to a PWM driver 255. The SV generator 254 computes the PWM time durations for each phase of the motor 210 to produce the desired Vαβ voltage values. The output of the PWM driver 255 is coupled to an input of the power driver 231 that has an output coupled to drive an input of the 3-phase inverter 232. In this voltage mode control embodiment, the 3-phase inverter 232 forces voltage onto the stator terminals associated with each of the three phases of the motor 210.

The FOC controller 220 or 220' can be a sensorless controller or can be a controller having a position sensor. FOC controllers having position sensors can include encoders and sensors that measure position directly and then estimate the angular speed therefrom. FOC controllers 220, 220' can be implemented by a MCU, such as the MCU chip 300 shown in FIG. 3 described below. Circuitry other than a MCU can also be used to realize FOC controller 220 or 220', such as implementing a disclosed RB controller block 240, external brake controller 245 and an EST block 215 using software stored in memory implemented by a computing device, and the battery management circuit 260 using hardware/circuitry, such as coprocessors or accelerators built using application-specific integrated circuit (ASIC) logic gates or field programmable gate arrays (FPGAs).

Figure 3:
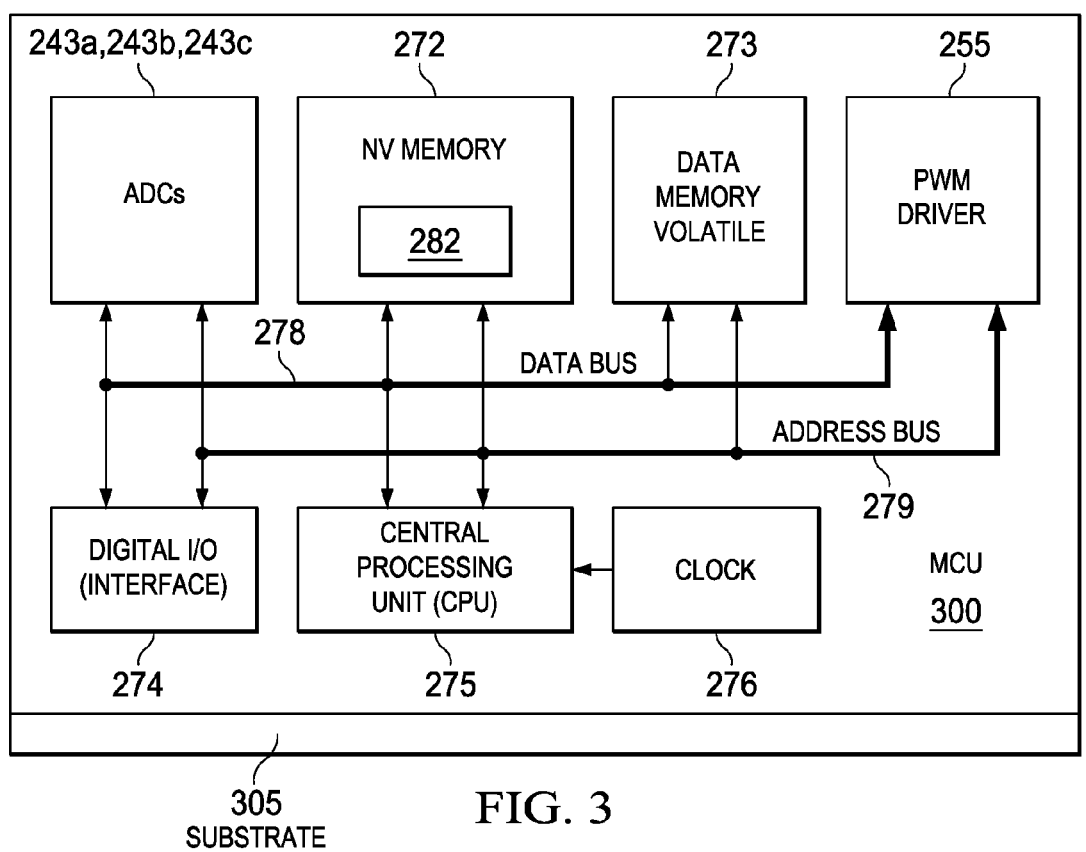
FIG. 3 is a block diagram depiction of an example microcontroller unit (MCU) chip formed on a substrate implementing the FOC controller shown in FIG. 2B including the RB controller, external brake controller and battery management circuit, according to an example embodiment.

FIG. 3 is a block diagram depiction of an example MCU chip 300 formed on a substrate 305 implementing the FOC controller 220' shown in FIG. 2B including the RB controller 240, external brake controller 245, and battery management circuit 260, according to an example embodiment. Although not shown, the MCU chip 300 typically includes other integrated circuit modules, for example, a Universal Serial Bus (USB) controller and a transceiver. MCU chip 300 is shown including NV memory 272, volatile data memory 273 shown as "data memory volatile", digital I/O (interface) 274, central processing unit (CPU) 275, and clock (or timer) 276. Core for implementing the EST block 215, RB controller 240, external brake controller 245 are shown collectively as 282 stored in NV memory 272, although it is possible one or more of these blocks or the controller can be implemented in hardware. MCU chip 300 is also shown including a digital data bus 278 and an address bus 279.

MCU chip 300 is shown as a monolithic integrated circuit (IC). The substrate 305 may comprise silicon, such as bulk silicon or silicon epi on a bulk silicon substrate. The substrate 305 may also generally comprise other materials, such as elementary semiconductors besides silicon including germanium. Substrate 305 may also comprise a compound semiconductor.

Figure 4:
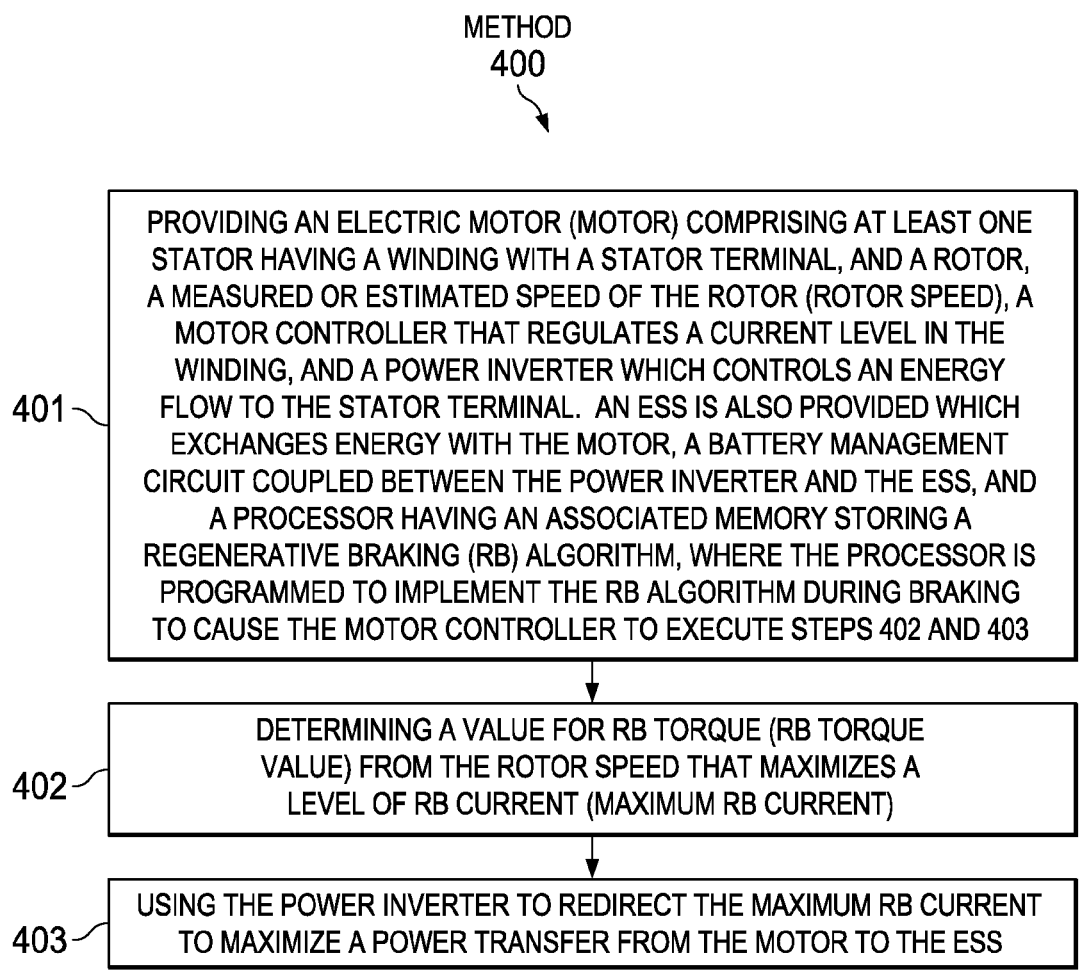
FIG. 4 shows steps in an example method of RB where each torque vs. speed value generated is designed to maximize the RB current returned to the ESS, according to an example embodiment.

FIG. 4 shows steps in an example method 400 of RB where each torque vs. speed value generated is designed to maximize the RB current returned to the ESS, according to an example embodiment. Step 401 comprises providing an electric motor (motor) comprising at least one stator having a winding with a stator terminal, and a rotor, a measured or estimated speed of the rotor (rotor speed), a motor controller that regulates a current level in the winding, and a power inverter which controls an energy flow to the stator terminal. An ESS is also provided which exchanges energy with the motor, a battery management circuit is coupled between the ESS and the power inverter, and a processor has an associated memory storing a RB algorithm, where the processor is programmed to implement the RB algorithm during braking to cause the motor controller to execute steps 402 and 403.

Step 402 comprises determining a value for RB torque (RB torque value) from the rotor speed that maximizes a level of RB current (maximum RB current). Step 403 comprises using the power inverter to redirect the maximum RB current to maximize a power transfer from the motor to the ESS.

The battery management circuit can control the maximum RB current flowing into the ESS using a current regulation circuit based on a maximum charging current level supported by the ESS. In some embodiments the motor includes an external brake, where the method further comprises determining a value for an external braking torque from the rotor speed to provide additional mechanical braking, and decomposing a desired torque level into two components wherein the motor controller applies the RB torque value as one torque component to provide the maximum RB current to recover energy and a second torque component is provided by the external brake to the motor to meet the desired torque command from the speed controller.

Benefits of disclosed algorithms include disclosed RB algorithms can be implemented for a variety of motor controllers, for example for the Texas Instruments' INSTASPIN-FOC sensorless motor control technology, such as for PICCOLO and POTENZA MCU chip-based motor controllers. In the case of INSTASPIN-FOC technology and related technology, code for the disclosed RB algorithms can be embedded in the ROM of the MCU chip (see NV memory 272 in FIG. 3).

Uses for disclosed embodiments include for electric automobiles such as the Tesla Model S P85+. Other example applications include any system that uses electric motors that operate at times with slowing or stopping, such as manufacturing and assembly lines, white appliances, elevators, cranes, and quadcopters.

Any equation described herein may be implemented by either hardware or by software. Regarding hardware-based implementations, a disclosed equation can be converted to a logic gate pattern, such as using VHDL which can then be realized such as using FPGA or application-specific integrated circuit (ASIC) to implement the logic gate pattern. VHDL is an acronym which stands for VHSIC (Very High Speed Integrated Circuits) Hardware Description Language. For example, a software-based implementation can be realized using a math library provided by a conventional MCU chip.

EXAMPLES

Disclosed embodiments are further illustrated by the following specific Examples, which should not be construed as limiting the scope or content of this Disclosure in any way.

Simulation Results

The disclosed RB algorithm was applied to a battery powered converter-controlled electric machine. The electric machine model was the Anaheim Automation Brushless DC motor (P/N: BLY172S-24V-4000). The battery pack comprised six A123 Racing AR26650M1B Li-Ion Nano Cells with each cell having a nominal voltage of 3.3V. The battery pack had a nominal voltage of 19.8V and an internal resistance of 36 mOhm. The parameters of the system are listed in Table 1 below.

TABLE 1

Parameters of the motor system used for Simulations

| Parameter | Description | Value | Units |
|---|---|---|---|
| $E_s$ | Nominal Open Circuit Battery Voltage | 19.8 | V |
| $R_s$ | Internal Resistance of Battery | 0.036 | Ohms |
| N | Number of Pole-Pairs of PMSM | 4 | — |
| $R_p$ | Per-Phase Stator Winding Resistance of PMSM | 1.2 | Ohms |
| $R_e$ | Per-Phase Core Loss Resistance of PMSM | 150 | Ohms |
| $L_d$ | D-axis Inductance of PMSM | 1.8 | mH |
| $L_q$ | Q-axis Inductance of PMSM | 1.8 | mH |
| $\Lambda$ | Magnitude of Permanent Magnet Flux | 0.010998 | V/rad/s |

TABLE 1-continued

Parameters of the motor system used for Simulations

| Parameter | Description | Value | Units |
|---|---|---|---|
| $I_{max}$ | Maximum Length of Current Vector in the d-q plane | 5.091 | A |
| $max(U_{dq})$ | Maximum Assignable Length of the Duty-Cycle Vector in the d-q plane | $\frac{3}{2\sqrt{2}}$ | — |
| $\omega_{max}$ | Maximum Mechanical Speed of the Machine | 9000 | RPM |
| $J_m$ | Rotor Inertia | $4.8 \times 10^{-6}$ | Kg-m$^2$ |
| $\beta_m$ | Rotor Viscous Friction Co-efficient | $5.0 \times 10^{-6}$ | Nm/rad/s |

The motor system was loaded with an external inertia and viscous friction load for the simulations. The system was assumed to start from a non-zero equilibrium point (non-zero speed and currents) and was slowed down to zero speed using closed-loop speed control with RB disabled (as a control) and enabled. The performance metrics are measured in terms of stopping time and energy recovered at the terminals of the battery. The energy recovered at the terminals of the battery is the time integral of the product of DC bus current and DC bus voltage t=0 to t=$t_{stop}$.

$$E_{elec} = \int_{t=0}^{t_{stop}} i_{dc} v_{dc} dt$$

If the value of $E_{elec}$ is negative, then it means that energy was returned to the ESS (regenerative braking) during the braking event and if the value of $E_{elec}$ is positive, then energy was removed from the ESS (non-regenerative braking) during the braking event. If the initial speed of the combined rotor-load combination is $\omega_0$, then the initial kinetic energy stored in the rotor is:

$$E_{mech,init} = \frac{1}{2}(J_m + J_L)\omega_0^2$$

The ratio if energy is recovered is expressed as:

$$E_{ratio} = \begin{cases} -\frac{E_{elec}}{E_{mech,init}}, & \text{if } E_{elec} < 0 \\ 0, & \text{otherwise} \end{cases}$$

The value for $\omega_{regen,min}$ was set to zero for the simulations. The value of rotor speed was initially set to $\omega_0$=100 rad/s. The value of the initial kinetic energy stored in the rotor-load combination was 1013.6 mJ. The results of the simulation for the scenario with regenerative braking disabled and enabled are shown in Table 2 below. The speed controller gains are not changed between the RB disabled and enabled cases.

TABLE 2

Simulation Results with Regenerative Braking Disabled and Enabled

| | | Regenerative Braking Disabled | | Regenerative Braking Enabled | |
|---|---|---|---|---|---|
| Load Inertia, $J_L$ (kg-m$^2$) | Viscous Friction Coefficient, $\beta_L$ (Nm/rad/s) | Stopping Time (ms) | Electric Energy, $E_{elec}$ (mJ) | Stopping Time (ms) | Electric Energy, $E_{elec}$ (mJ) |
| $1.98 \times 10^{-4}$ | $3.16 \times 10^{-5}$ | 203.7 | 550.51 | 1193.9 | −432.4 |

It can be seen that operation with the RB algorithm disabled stops very fast but consumes energy from the battery to do so ($E_{ratio}$=0). In contrast, operation with the RB algorithm enabled has recovered about 42.65% of the initial kinetic energy ($E_{ratio}$=4.265), however it took about six times longer to come to a stop.

Figure 5:
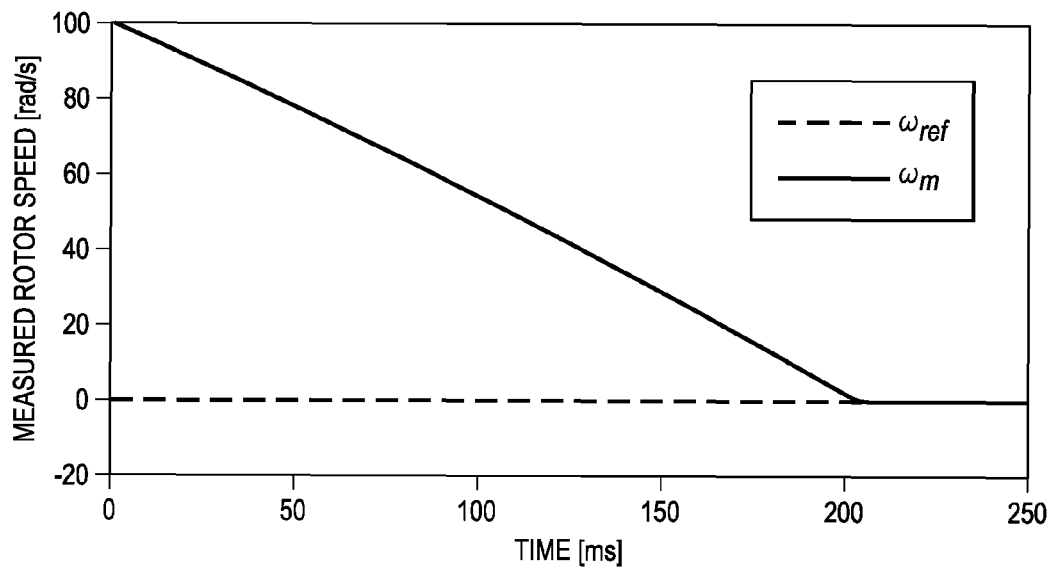
FIG. 5 shows a simulated speed response for the case with disclosed RB algorithm disabled.
Figure 6:
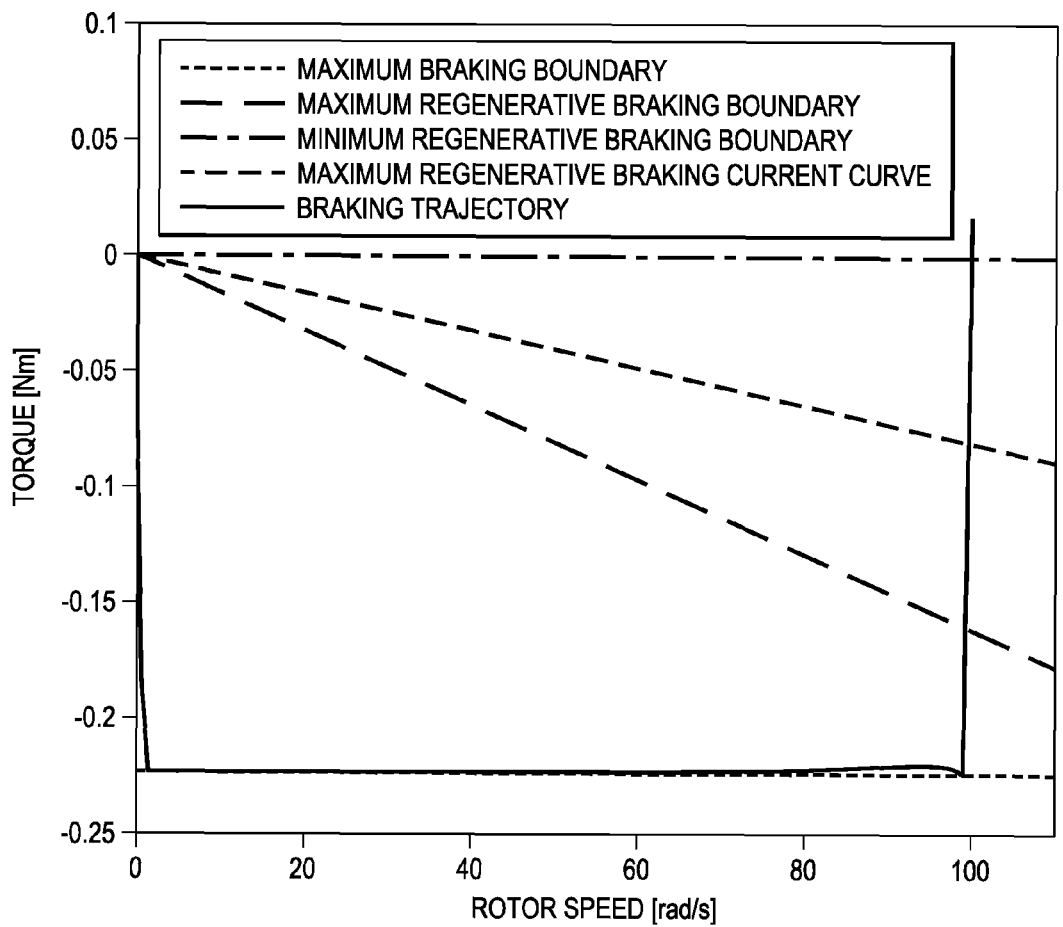
FIG. 6 shows a simulated braking trajectory in the torque-speed plane with a disclosed RB algorithm disabled, according to an example embodiment.

The simulation plots for the scenarios in Table 2 are described below. The speed response for the case with the RB algorithm disabled is shown in FIG. 5. The braking trajectory in the torque-speed plane is shown in FIG. 6. It can be seen that most of the braking trajectory is in the non-RB region (below the maximum regenerative braking boundary) which explains why there was no charge returned to the battery.

Figure 7:
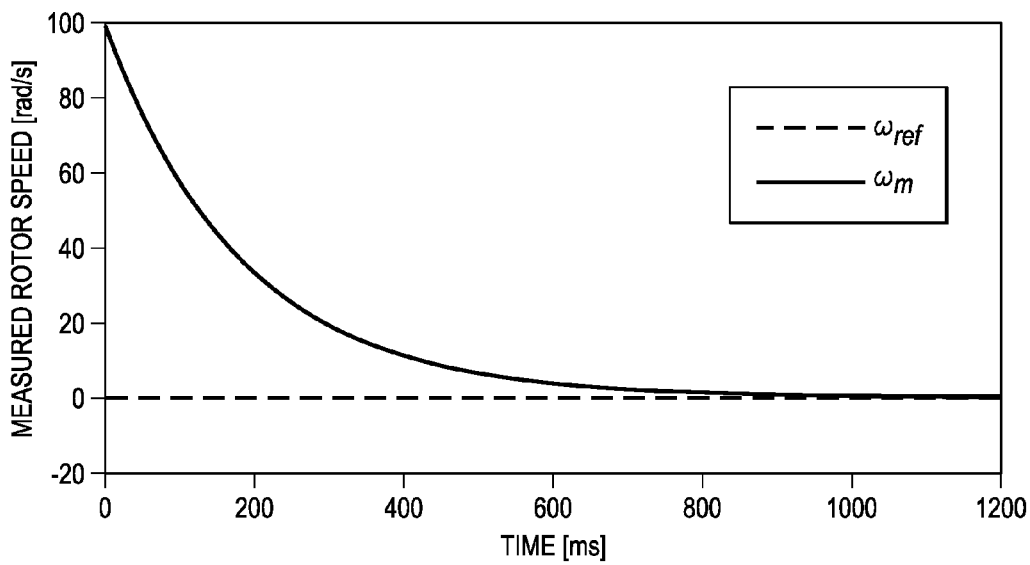
FIG. 7 shows the simulated speed response with the disclosed RB algorithm enabled.
Figure 8:
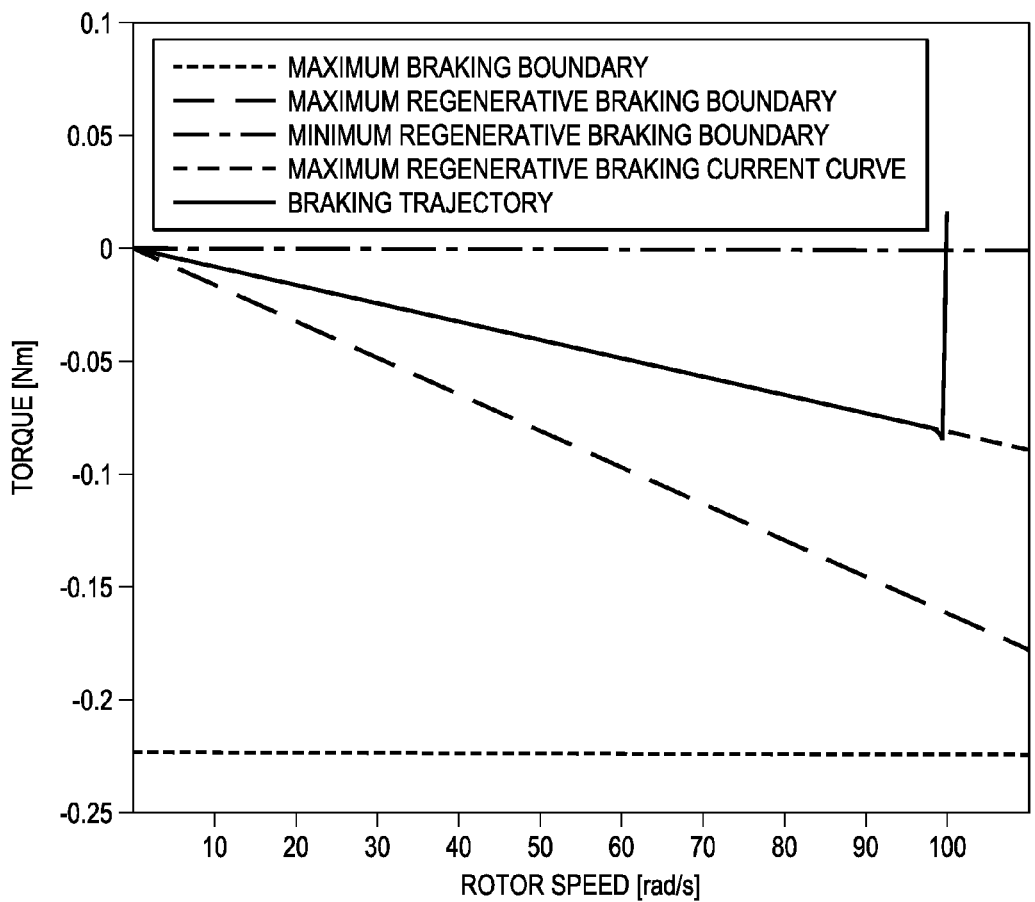
FIG. 8 shows the simulated braking trajectory on the torque-speed plane with the disclosed RB algorithm enabled.

FIG. 7 shows simulation results for scenario with the RB algorithm enabled. The speed response as seen in FIG. 7 approaches zero asymptotically. A faster braking event can be achieved by setting the value of $\omega_{regen,min}$ to a non-zero value at the cost of less energy being recovered by the RB algorithm. The braking trajectory as seen in FIG. 8 approaches and stays on the curve of maximum regenerative braking current defined by equation 1 shown above. This results in maximum current flowing back into the battery at every rotor speed.

Figure 9:
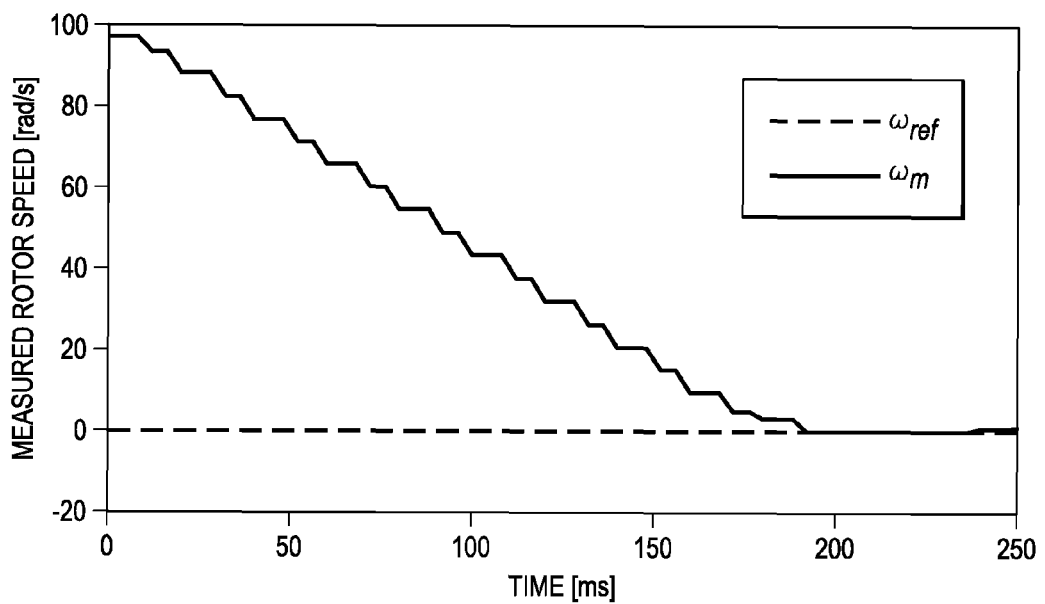
FIG. 9 shows the measured speed response with disclosed RB control disabled.
Figure 10:
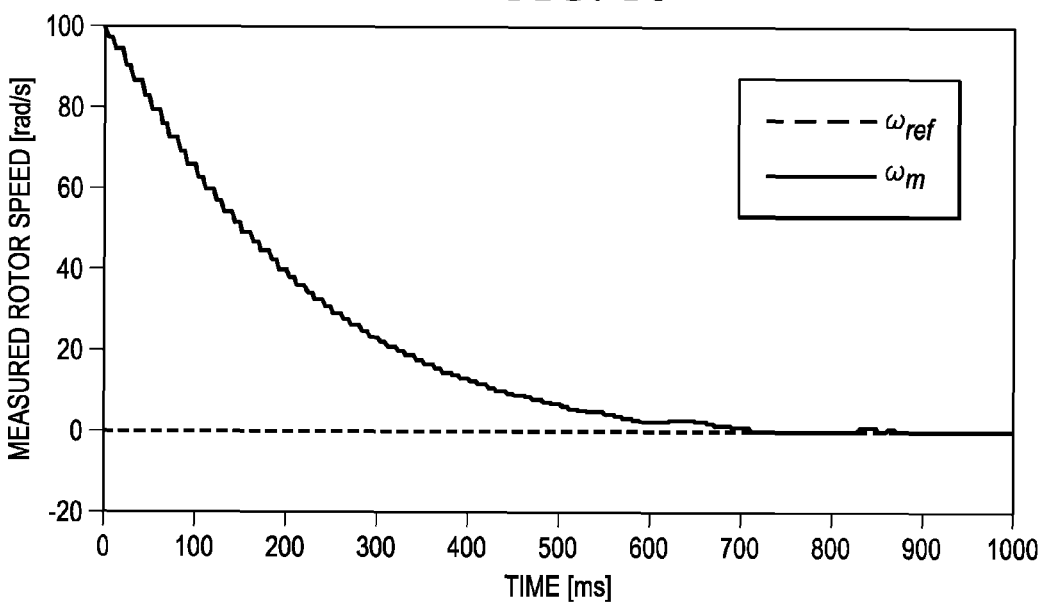
FIG. 10 shows the measured speed response with disclosed RB control enabled.

The motor system described in Table 1 above was set up on the laboratory bench with an aluminum disc as the inertial load. The machine was controlled using the Multi-Axis Motor Control Kit with the TMS320F28069 Piccolo series microcontroller from Texas Instruments. The values of inertial load and viscous friction co-efficient correspond to those of case 4 of Table 2. The inertial load was accelerated to a constant speed of 100 rad/s and then brought to a stop with the RB algorithm disabled and enabled. The results of the experiment are shown in Table 3 below and the measured speed responses for the RB algorithm disabled and enabled are shown in FIG. 9 and FIG. 10, respectively.

The experimental results show that the stopping time with the RB algorithm enabled is about 3.5 times that with the RB algorithm disabled. With the RB algorithm disabled, the battery expends energy in order to bring the inertia to a stop resulting in a net positive electric energy as seen in Table 3. However with the RB algorithm enabled, there is a conversion of mechanical energy from the rotating inertial load to electrical energy that charges the battery. The energy recovered in the case with the RB algorithm enabled was about 41.38% of the initial kinetic energy that was stored in the rotating rotor-load combination. When comparing the simulation results to the experimental results, the stop time in the experiments is shorter than the simulations. The primary reason for this difference is due to unmodeled dynamics in the system simulation such as inverter loss. This unmodeled effect is also visible in the amount of energy stored back into the battery, which is less for the experiments than for the simulations.

TABLE 3

Experimental Results with Regenerative
Braking Disabled and Enabled

| Load Inertia, $J_L$ (kg-m²) | Viscous Friction Coefficient, $\beta_L$ (Nm/rad/s) | Regenerative Braking Disabled | | Regenerative Braking Enabled | |
|---|---|---|---|---|---|
| | | Stopping Time (ms) | Electric Energy, $E_{elec}$ (mJ) | Stopping Time (ms) | Electric Energy, $E_{elec}$ (mJ) |
| $1.98 \times 10^{-4}$ | $3.16 \times 10^{-5}$ | 192.0 | 427.2 | 712.0 | −419.5 |

Conclusion

From the simulations and experiments, it can be concluded that by using a disclosed RB algorithm there is a significant increase in charging power going into the ESS such as a battery at the expense of an increase in average stopping time for a motor system with no external mechanical brake. However, as described above, disclosed embodiments can also benefit motor systems having an external mechanical brake.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A microcontroller unit (MCU) chip, comprising:
a substrate having the following formed thereon configured to realize a motor controller for controlling an N-phase electric motor (motor) comprising at least one stator having a winding (stator winding) with a stator terminal, and a rotor, including:
  at least one analog-to-digital converter (ADC) for receiving resulting N-phase measurements from current measurement circuits or voltage measurement circuits coupled to said stator windings associated with each of said N-phases;
  a pulse-width modulation (PWM) driver;
  a central processing unit (CPU) coupled to a first non-volatile program memory including code for realizing a regenerative braking (RB) algorithm, a speed controller, an angular velocity estimator (EST) block, and a reference current generator block having an input coupled to receive an output from said ADC's, wherein said reference current generator block has respective inputs coupled to an output of said EST block and an output of said speed controller, an D-axis current controller for controlling direct (d) current and an Q-axis current controller for controlling quadrature (q) current having inputs coupled to an output of said reference current generator block and outputs coupled to said PWM driver through a space-vector generator (SVG) block;
  a digital I/O (interface);
  said CPU coupled through said digital I/O (interface) to receive said N-phase measurements after processing by said ADC's;
  a clock, and a digital data bus and an address bus for coupling together said ADC's, said program memory, said digital I/O (interface), said CPU, and said clock,
  wherein said RB algorithm utilizes a measured or estimated speed of said rotor (rotor speed) from said EST block during braking of said motor to cause said motor controller to execute:
    determining a value for RB torque (RB torque value) from said rotor speed that maximizes a level of a RB current (maximum RB current), and
    using a power inverter to redirect said maximum RB current to maximize a power transfer from said motor to an energy storage system (ESS) coupled to exchange energy with said motor by a battery management circuit coupled between said power inverter and said ESS.

2. The MCU chip of claim 1, wherein said battery management circuit (controls said maximum RB current using a current regulation circuit based on a maximum charging current level supported by said ESS.

3. The MCU chip of claim 1, wherein said motor includes an external brake, and said program memory further includes code for realizing an RB controller having an input coupled to receive a desired braking torque level ($\tau_{desired}$) output by said speed controller, an external brake controller coupled to receive an external braking torque ($\tau_{ext}$) output by said RB controller for coupling to drive said external brake,
said RB algorithm further including code for during braking of said motor to cause said motor controller to execute:
  determining a value for said $\tau_{ext}$ from said rotor speed to provide additional mechanical braking, and
  decomposing said $\tau_{desired}$ into two components wherein said motor controller applies said RB torque value as one torque component to provide said RB current and a second torque component provided by said external brake to said motor to meet said $\tau_{ext}$.

4. The MCU chip of claim 1, wherein said motor comprises a permanent magnet (PM) motor and wherein said RB algorithm further includes code for computing said RB torque value ($\tau_{regen}$) using:

$$\tau_{regen} = -\left(\frac{K_b^2}{2R_s}\right)\omega$$

wherein said $\omega$ is said rotor speed, said $K_b$ is a back-EMF constant of said PM motor, and said $R_s$ is a resistance of said stator windings.

5. The MCU chip of claim 1, wherein said program memory stores a table including a plurality of said RB torque values versus said rotor speed, and said RB algorithm further includes code for using said table for said determining said RB torque value in real-time.

6. The MCU chip of claim 1, wherein said program memory stores a closed-form expression that relates said RB torque values with said maximum RB current that said RB algorithm has code for utilizing.

7. The MCU chip of claim 1, wherein said motor controller implements field-oriented control (FOC).

* * * * *